United States Patent [19]

Hertz

[11] Patent Number: 4,800,396

[45] Date of Patent: Jan. 24, 1989

[54] COMPENSATION METHOD AND DEVICE FOR INK DROPLET DEVIATION OF AN INK JET

[76] Inventor: Carl H. Hertz, Skolbänksvägen 8, S-22367 Lund, Sweden

[21] Appl. No.: 70,922

[22] Filed: Jul. 8, 1987

[51] Int. Cl.[4] .............................................. G01D 15/18
[52] U.S. Cl. ........................................ 346/1.1; 396/75
[58] Field of Search .................................... 346/1.1, 75

[56] References Cited

U.S. PATENT DOCUMENTS

| | | | |
|---|---|---|---|
| 3,596,275 | 7/1971 | Sweet | 346/1.1 |
| 3,916,421 | 10/1975 | Hertz | 346/75 |
| 4,562,442 | 12/1985 | Jinnai et al. | 346/75 |
| 4,620,196 | 10/1986 | Hertz | 346/1.1 |

OTHER PUBLICATIONS

IBM J. Res. Develop., Controlling Print Height in an Ink Jet Printer; J. M. Carmichael; Jan. 1977, pp. 52–55.

*Primary Examiner*—E. A. Goldberg
*Assistant Examiner*—Gerald E. Preston
*Attorney, Agent, or Firm*—Bernard J. Lacomis

[57] ABSTRACT

A charge to deflect ink jet printer employs a correction signal to ink droplets to afford more accurate placement on a medium. Assessing the deviation of charged ink droplets from intended and actual impact locations, a control unit then determines an adjustable bias voltage for application to each charged droplet to compensate for the deviation and thus achieve improved image enhancement. This system is well suited for multiple nozzles which may be multicolor such as in computer printers. Both a method of operation and an apparatus are attendant to this system.

17 Claims, 6 Drawing Sheets

COMPENSATION METHOD AND DEVICE FOR INK DROPLET DEVIATION OF AN INK JET

BACKGROUND OF THE INVENTION

The invention generally relates to methods and apparatus for ink jet printing and plotting, but more specifically the invention relates to ink jet recording methods and apparatus, wherein

- at least one ink jet is produced which disintegrates into a series of minute drops,
- the drops are selectively charged to determine whether an individual drop, in a recording mode, is intended to travel along a recording path onto a predetermined location on a record or target surface or is prevented to produce a record on said surface,
- each charged drop is deflected by an electric field by an amount depending on the charge of the drop, and
- relative transverse motion is effected between the path of the record producing drops and the record surface.

Electrical controlled, continuously generated ink jets are used in many fields of industry and technics to print alphanumeric characters or images in color. In several of such applications a plurality of such jets is used simultaneously. Ink jet plotters which are used as output devices to print out color images prepared or processed by computers are a typical example of such applications. A typical ink jet color plotter comprises three nozzles which are mounted on a carriage and produce continuously three ink jets having the colors magenta, yellow and cyan, respectively, and directed towards an ink receiving surface, as a recording paper mounted on a drum, where the jets impinge on the paper in three separate, well defined locations. If the drum is rotated at high speed and the carriage is slowly moved along the drum axis by a stepper motor and a lead screw, each point of the recording paper surface is addressed once by each of the jets. By on-off control of jets by electrical signals derived from a signal source, e. g. a magnetic tape read synchronously with the plotting operation, images prepared by a computer and recorded on the tape can be plotted in color. A preferred technique of ink jet control is described in U.S. Pat. No. 4,620,196 incorporated herein by reference thereto.

In a plotter of the above described type, actually three color separations of the image in the colors magenta, yellow and cyan are printed on top of each other, thus rendering a full color image. Usually one more, fourth jet with black ink is used to enhance the color density and resolution. To achieve maximum image quality it is of course very important to ensure good registry between the three or four color separations making up the final image.

When processing an image by a computer, usually the color density of each pixel of each of the color separations is calculated in the form of a digital number. These numbers are then converted into suitable electrical control signals by an electronic control circuitry of the plotter. These control signals are then used to control the respective jets at the precise moments when the jets address, i. e. are directed to the pixel positon in question. Since the jets do not meet on the paper but are separated from each other by a well defined distance to avoid mixing of the liquid inks, a suitable delay has to be introduced between the control signals which control the ink jets for recording the individual color separations.

If the directions of the jets are not carefully controlled, the jets will not print the pixel information supplied by the computer on the same pixel position. This results in an incorrect registry of the color separations and are correspondingly debased image quality.

In the ink jet plotters presently available the registry of the ink jets is obtained by manually adjusting the direction of the nozzles mounted on the carriage. Since the nozzle and, thus, jet direction may vary slightly between subsequent plotting operations due to various causes, the adjustment may have to be carried out quite frequently. This is time consuming and cannot be effected by untrained personel. The problem of the nozzle adjustment is particularly aggravating in plotters employing more than three or four jets to increase the plotting speed, e. g. in ink jet printing machines or plotters which are intended to be used as high speed printers or to replace conventional printing machines. Such a high speed plotter may comprise 100 to 500 jets and it is obvious that in such a case a manual adjustment of each of these many nozzles is not feasible any more. Thus, it is desirable to provide a method and a device which allow the jet adjustment solely by electrical signals and further to perform this adjustment automatically by means of a suitable control circuitry.

To ensure perfect registration of a plurality (two or more) of ink jets, e. g. of the ink jets which record three or four color separations which together constitute a color image, it is necessary that each of the jets (with possible exception of one jet, which may serve as reference) can be adjusted in two directions, more specifically in case of a drum plotter along the drum axis of the plotter and normal to the drum axis, i. e. along the circumference of the drum. In the following, these two directions will be referred to as the x and y directions, respectively. These directions are defined on the recording surface, e. g. the recording paper, in a similar manner. With these coordinates and an appropriately chosen origin, the position of each pixel of the image can be defined by its x and y coordinates.

It has been described in U.S. Pat. Nos. 3,596,275 and 3,916,421 that the drops, into which a continuously ejected ink jet disintegrates, can be electrically charged by applying a suitable voltage between the ink liquid in a conduit leading to the nozzle from which the jet issues, and a control electrode. If a DC voltage is used for charging, all drops will be equally charged. If the mass of the drops is kept constant by mechanical stimulation of the jet by an ultrasonic transducer as taught by U.S. Pat. No. 3,596,275, these equally charged drops of equal masses will be deflected by an equal amount by an electric deflection field established in a space between a pair of deflection electrodes through which the drops propagate toward the recording medium.

In the ink jet recorder described in U.S. Pat. No. 3,916,421 uncharged drops can proceed to the record surface in a "print" or "on" mode of operation, while sufficiently charged drops are deflected by the deflection field into a gutter and removed by suction (in other printers, the charged drops print and the uncharged drops are intercepted).

SUMMARY OF THE INVENTION

It is an object of the invention, to adjust the direction of the or each ink drop jet in an ink jet apparatus by electrical means to cause the record producing ink drops of each jet to land on a desired location on a recording surface. In a first aspect, the present invention relates to an ink jet recording method, wherein at least one ink jet is produced which disintegrate into a series of minute drops, the drops are selectively charged to determined whether an individual drop, in a recording mode, is intended to travel along a recording path to impinge onto a predetermined location on a record surface or is prevented to produce a record on said surface, each charged drop is deflected by an electric deflecting field by an amount depending on the charge of the drop, and relative transverse motion is effected between the path of the record producing drops and the record surface, and solves the problem, according to an embodiment of the invention, the method comprises additional method steps:

Determining any deviation between said predetermined location and an actual location of impingement of the record producing drops of the jet, and applying an adjustable bias charge to each drop at least during the recording mode, said bias charge being chosen so that the deflection of the drop caused by the action of said electric deflecting field on said bias charge carried by said drop minimizes said deviation.

According to a second aspect of the invention, an apparatus useful for adjusting the direction of a jet in an ink jet printing device using at least one electrically controllable continuous ink jet and comprising a. nozzle means to generate a liquid jet which disintegrates into a train of drops at a point of drop formation, b. control electrode means to charge the drops of the jet by an electrical control signal, c. means to generate an electric deflection field approximately perpendicular to the jet direction, d. means to select the drops on the basic of their charge to determine, whether a specific drop proceeds to and impinges on a predetermined location on a record receiving surface or is intercepted and prevented to proceed to said surface is characterized according to the invention by e. means to apply an adjustable DC voltage between the jet liquid and the control electrode means which allows the adjustment of the jet direction in a plane parallel to the electric deflection field, and bias voltage being appreciable lower than the control signal voltage which affects said selection.

In the preferred case of an ink jet method and apparatus employing a plurality of ink jets of different colors for applying to each of a plurality of pixel areas a corresponding plurality of amounts of said different colored inks, to record a plurality of color separation images, the biases are chosen such that the ink jets are in registry as closely as necessary at said pixel positions.

Further objects, features and advantages of the invention will become apparent to those skilled in the art when reading the following description of preferred exemplary embodiments with reference to the drawings.

DETAILED DESCRIPTION OF THE INVENTION

Figure 1:
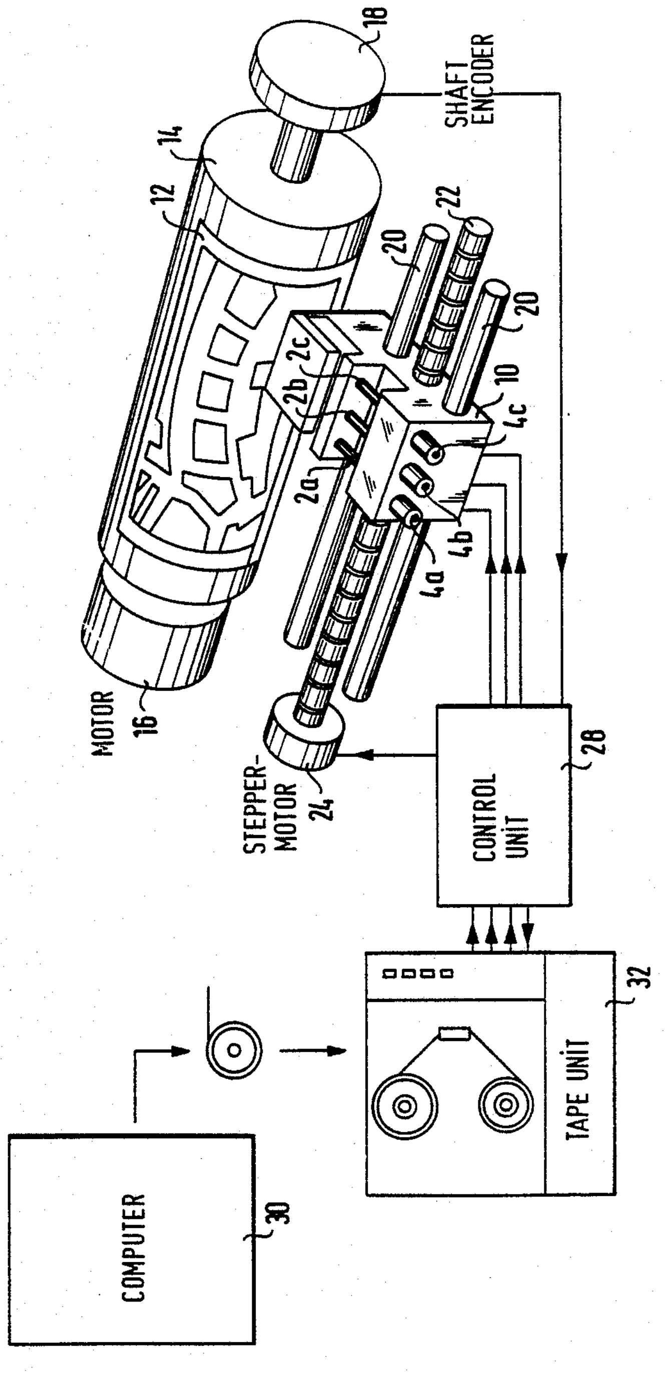
FIG. 1 is a partially isometric, partially diagrammatic view of a known three ink jet drum plotter in which the present invention can be embodied by modifying the electrode systems and control circuitry associated to the respective jets.

Reference is now made to FIG. 1 which shows only those parts and circuits of a conventional three ink jet drum plotter, which are necessary for the understanding of the present invention. The plotter comprises three nozzles 2a, 2b and 2c connected by respective conduits 4a, 4b, 4c, respectively, which are only partially shown, to pressurized ink sources (not shown) which supply the nozzles with magenta, yellow and cyan colored inks, respectively.

The nozzles 2a to 2c are mounted on a carriage 10 in such a way that the ink jets ejected from the nozzles are directed toward a recording material, as paper 12, mounted on a rotatably supported drum 14. the drum 14 has its shaft coupled to a motor 16 and a shaft encoder 18. The carriage is mounted on rails 20 and movable in the axial direction of the drum 14 by means of a lead screw 22 driven by a stepper motor 24. Each of the conduits 4a, 4c comprises an electrode 26 (FIG. 2) coupled to a control unit 28. Image signals may be produced by a computer 30 and stored on a tape of a tape unit 32 which delivers image or density signals to the control unit 28. In operation, the drum 14 is rotated at high speed by the motor 16 and the carriage 10 is moved slowly along the drum axis by the stepper motor 24 and the lead screw 22 and each image element (pixel) is addressed once by each of the jets which impinge on the paper 12 in predetermined, spaced locations. By on/off control of the jets by electrical signals delivered by the control unit 28 under control of the information read simultaneously from the tape or in the tape unit 32, the color images prepared or processed by the computer, are recorded on the paper 12.

Figure 2:
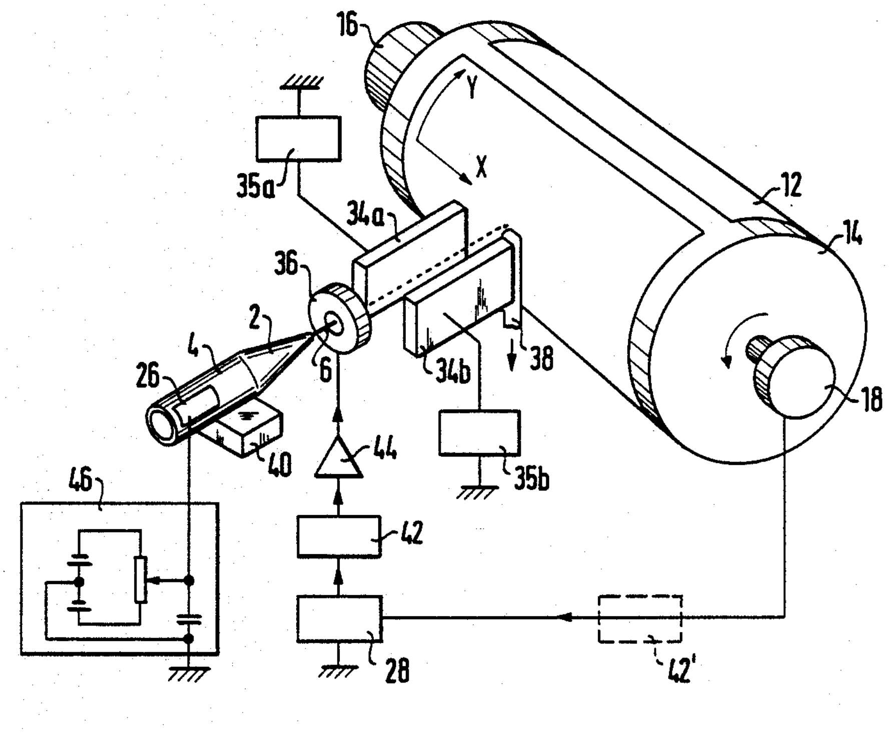
FIG. 2 is a simplified view of a single electrode system for explaining one aspect of the ink jet position control according to the invention.

It has been explained above, that the location of the landing points of the jets must be carefully controlled both in the x and y directions to obtain a satisfactory registry of the three color separations. Different methods are used for obtaining the registry in the x and y directions, and the principle of obtaining the desired registry in the x direction will be described first. To achieve an electrical adjustment of a predetermined jet in the x or axial direction of the drum, a deflection electrode system of the same general type is used as it is described for continuous jet control in U.S. Pat. Nos. 3,596,275, and 3,916,421 mentioned above. However, the effective planes of the deflection electrodes are reoriented to extend normal to the drum axis as shown in FIG. 2. The electrode system comprises a pair of spaced planar deflection electrodes 34*a*, 34*b* between which an ink jet 6 ejected from the nozzle 2 with high speed travels toward the record medium. The deflection electrodes (34*a*, 34*b*) are coupled to positive and negative high voltage sources 35*a*, 35*b*, respectively. An annular control electrode surrounds the jet 6 between the mouth of the nozzle 2 and the pair of deflection electrodes 34*a*, 34*b*. Jet intercepting means, as a gutter 38, is positioned near the drum surface at a position which allows to deflect the path of the jet into the gutter 38 to prevent the jet from printing. The described orientation of the electrodes 34*a*, 34*b* has the effect that an electric DC deflection field generated between these electrodes extends essentially parallel to the drum axis or x direction.

It is well known in the art that the ink jet 6 disintegrates into a series of minute drops and that these drops can be electrically charged by applying a suitable voltage between the ink in the conduit 4 and the control electrode 36 which surrounds the point of drop formation. If a DC bias is applied between the ink electrode 26 and the control electrode 36, each drop will receive the same charge. If further the drop mass is kept uniform by mechanical stimulation of the jet by means of an ultrasonic transducer 40 as described in U.S. Pat. No. 3,596,275, the equally charged drops will be deflected by an equal amount in the x direction during their journey through the electric field between the deflection electrodes 34*a*, 34*b* on their way from the control electrode 36 to the recording medium 12. Thus, by varying this DC bias, the point of impingement of the ink jet on the recording surface can be adjusted in the x direction.

In the ink jet recorder described in U.S. Pat. No. 3,916,421, uncharged drops or more precisely drops carrying a charge below some cut-off threshold value can proceed to the recording medium in the "print" or "on-mode" without being deflected by the deflection field into the gutter. During the "off-mode" of operation, the charged drops are deflected by the deflection field into the gutter 38 and removed by suction. It is assumed, that the plotter of FIG. 2 effects the printing in essentially the same way: Pulse-shaped control signals varying between zero voltage and a cut-off voltage $V_s$ from the control unit 28 charge some of the drops by applying a voltage through a delay circuit 42 and an amplifier 44 to the control unit 36. Depending on the charge the drops receive in response to the applied voltage, the drops proceed either to the recording medium 12 or into the gutter 38. According to the invention, a predetermined bias is applied to the control electrode 36 during the print mode of operation to electrically adjust the point of impingement of the jet in the x direction without causing the drops to be deflected into the gutter. This bias may be introduced by a variable DC bias source 46 interposed between the ink electrode 26 and ground. The DC bias is in any case essentially smaller than the cut-off voltage and it is adjustable or selectable in a way explained above in contrast to the small bias voltage previously used for preventing the drops from merging on their way to the recording medium. Under normal conditions they prevail in ink jet plotters as described in the above mentioned United States patent, specifications a typical voltage range of the DC bias is from −30 Volts to +30 volts.

The adjustment of the point of incidence of the jet 6 in the y direction utilizes the fact that the drum 14 rotates with constant speed during the recording operation. In the system shown in FIG. 2 the amount of ink applied to a given pixel position x, y is determined by the control signal delivered from the control unit 28 and synchronized by a signal derived from the shaft encoder 18. Delaying this signal by the delay circuit 42 shifts the time of occurrence of the shaft encoder signal with respect to the generation of the control signal, and, thus, the location where the ink is applied on the record medium, in the y direction. Since the surface of the drum rotates with the constant velocity v the position of the pixel will be shifted by an amount v . t in the y direction, wherein t is the delay introduced by the delay circuit 42. Thus, by controlling the delay time introduced by the delay unit 42, the position of the pixel can be adjusted in the y direction. Since the delay time introduced by the delay unit 42 can be controlled electrically in known manner in various ways, the y position of the recorded pixels can be electrically adjusted within wide limits.

Since the position of the pixels can be adjusted independently in both the x and y direction by suitable electrical signals, the adjustment can be effected automatically by appropriate control circuits. This implies, however, that the actual landing position of each jet is known in the x and y directions and that error signals are available which allow the automatic control. This aspect of the invention will be explained below with reference to FIGS. 5 and 6.

Figure 3:
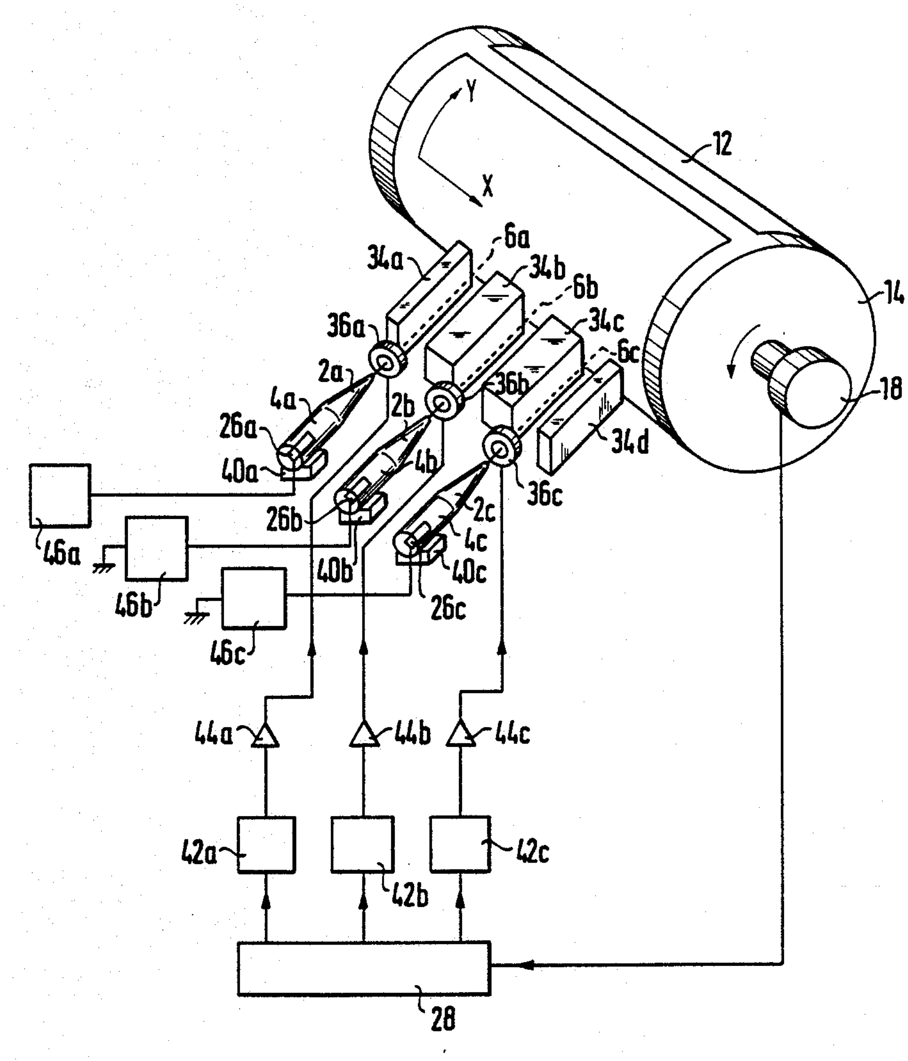
FIG. 3 is a schematic view of essential parts of a three ink jet drum plotter and associated adjustment circuitry.

Reference is now made to FIG. 3 which shows a schematic isometric view of some portions of a three jet drum plotter and a block diagram of associated circuitry according to a preferred embodiment of the invention. It will be obvious to those skilled in the art, that the same principles may be embodied in an ink jet apparatus using more than three jets or in a flat bed plotter having an essentially plane recording surface and comprising one or more transversing recording heads carrying a plurality of ink jet nozzles. For the sake of clarity, FIG. 3 shows only those parts of the plotter which are essential for the understanding of the present invention. Thus, e. g. the carriage 10, the lead screw 22 and the motors 16, 24 shown in FIG. 1 are omitted in FIG. 3.

The apparatus of FIG. 3 comprises three nozzles 2*a*, 2*b*, 2*c* connected to respective ends of conduits 4*a*, 4*b*, 4*c*, respectively, to produce three ink jets 6*a*, 6*b*, 6*c*, respectively, of different colors, to register three color separations. In other applications, some or all of the jets may issue ink of the same color.

Each jet 2*a* to 2*c* disintegrates into a series of drops which can be charged by an individual control signal from the control unit 28, which is applied to each control electrode via an individual delay unit 42*a*, 42*b*, 42*c*, respectively, and amplifier 44*a*, 44*b*, 44*c*, respectively. An electric deflection field acting in the x direction is generated for each beam by means of deflection electrodes 34*a*, 34*b*, 34*c*, 34*d* positioned as shown in FIG. 3 and having the same object as the pair of electrodes 34*a*, 34*b* described with reference to FIG. 2. The deflection electrodes 34*a* and 34*c* are coupled to a positive high voltage source and the electrodes 34*b* and 34*d* are coupled to a negative high voltage source. The voltage sources are not shown in FIG. 3, they correspond to the voltage sources 35*a*, 35*b*, respectively shown in FIG. 2.

The faces of the deflection electrodes 34a to 34d are essentially normal to the drum axis so that the direction of the electric deflection fields produced between each pair of adjacent electrodes is essentially parallel to the x-direction.

As in the plotter described with reference to FIG. 2, the on-off-modulation of each jet is controlled by applying a suitable control signal to the respective control electrode 36a–c. In the embodiment shown, the control voltage is zero in the print mode of operation and about +80 to +200 Volt in the off-mode of operation. A gutter or other intercepting device (not shown in FIG. 3) is associated to each jet and this device should be large enough to allow the interception of the respective jet within some range of "off" voltage.

Alternatively, the DC bias for x adjustment can be applied to the control electrodes 36a to c, and the on/-off-signal is then applied to the respective ink electrode 26a, 26b, 26c, respectively. Another alternative is to couple the respective DC bias sources 46a to 46c in series between the control signal source and the electrodes 26a–c or 36a–c to which the control signal is applied. Still another alternative is to use appropriately biased amplifiers with DC output as amplifiers 44a, 44b and 44c.

It is obvious, that each of the three jets 6a, 6b and 6c of the plotter of FIG. 3 can be individually adjusted in the x direction by varying the DC bias supplied e. g. by the bias sources 46a, 46b, 46c. It should be obvious that the described principle can be employed with any number of fluid jets.

Reference is now made again to FIG. 2 for describing the process of adjusting the point of incidence of an ink jet in the circumferencial or y direction.

For obtaining a distortionless record of an image on the rotating recording medium 12 it is necessary to synchronize the generation of the control signals by the control unit 28 with the drum rotation. This is usually achieved by the shaft encoder 18 which is connected to the drum axis and generates one clock pulse for each pixel to be printed on the circumference of the drum. The positions of the pixels in the y direction depend obviously on the timing of these clock pulses relative to the angular position of the rotating drum 7. Thus, by changing this timing by means of the variable delay unit 42, the position of the pixels and, thus, also the entire image can be shifted in the circumferential or y direction relative to the recording medium 12 on the drum 14.

The delay unit 42 may take the form of a shift register continuously clocked by a voltage controlled oscillator not shown in FIG. 2. Thus, the control signal from the control unit 28 will be delayed by the delay unit 42 by a certain period of time which is variable by the electric signal applied to the voltage controlled oscillator VCO. Thus, the delay and therefore the position of the image recorded on the record medium 12 can be shifted by purely electrical means.

It should be obvious to those skilled in the art that the delay for adjusting the y position of the pixels can be effected in various ways. E. g. a controllable delay circuit can be inserted in the signal path from the shaft encoder 18 to the control unit 28. Alternatively and preferably, a signal pulse generated once per revolution by the shaft encoder 18 to indicate the beginning of the image can be shifted in time for each of the three colors by simple digital delay circuits, one of which being shown at 42' in FIG. 2. By this means, the start of the read-out process of the density information for each of the three color separations from a random access memory RAM containing the color density information for each circumferential scan line can be varied. Still other implementations of the delay will occur to those skilled in the art.

It is obvious, that the above described y adjustment method can be performed individually separately with each of the three jets 6a to 6c in FIG. 3 to provide for an adjustment of the registry of the three color separation images printed by the three jets in mutually superimposed relationship. This is achieved by separate electrically controllable delay circuits 42a, 42b and 42c coupled in series into the signal lines leading to the control electrodes 36a, 36b, 36c. The alternatives mentioned above with reference to FIG. 2 may also be used in the case of the three jet plotter of FIG. 3.

The two methods described above allow the adjustment of the point of impingement of each jet on the recording medium both in the x and y directions exclusively by electrical signals. The adjustments can be effected independently of each other. It is therefore possible to provide for an automatic adjustment of the jets by appropriate automatic control circuits.

To effect an automatic adjustment of the position of the printed pixels it is necessary to measure the deviation of the actual point of incidence of each jet on the record medium from the desired point of incidence both in the x and y directions. Preferred methods for this object will be described below. While the described methods will be applicable to any number of jets, the following description will refer to a single jet only for the sake of simplicity.

Carmichael describes in IBM J. Res. and Dev., Vol 21, p. 53 (1977) a method to detect the drops of a charged jet by electric means. It is further known that the jet itself and thereby its direction can be monitored by an optical device usually including light emitting diodes. However, both of these methods are difficult to perform with jets of very small diameter. To avoid these difficulties, first a method is proposed, in which the trace generated by the jet on the recording medium is detected by electro-optical means mounted close to the rotating drum. The jet is controlled by a suitable control signal in such a way that it prints a predetermined pattern, as a grid, on the record medium during the adjustment process. This pattern is then detected by photoelectric means positioned closely to the rotating drum, to determine its position, and to produce a corresponding position signal. By comparing this position signal from the photoelectric means with a reference signal an error signal is derived which then is used as an input signal to the adjustment circuits 46 in FIGS. 2 and 3. In this way the jet directions are adjusted until the error signal is zero. The adjustment obtained by this procedure is maintained during the following actual plotting operation.

While this optical method to generate the error signal for both the x- and y-adjustment is a satisfactory approach even for small jets, in the following a different and more simple, and thus, preferred method for the automatic adjustment of the jets will be described. Again, for simplicity, the principle of the method will be described for one jet only but it can readily be applied also to a plurality of jets.

Figure 4:
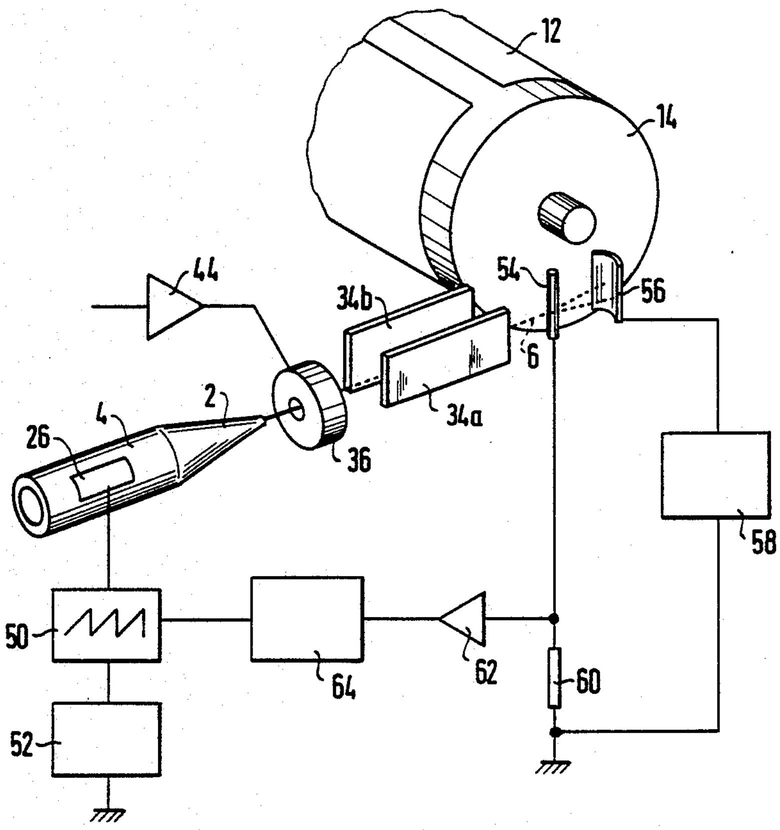
FIG. 4 is a simplified view of a part of an ink jet plotter and associated adjustment means according to an aspect of the invention.

FIG. 4 shows a preferred embodiment of a device for automatic adjustment of a fluid jet in the x direction. In this device the carriage 17 in FIG. 1, not shown in FIG.

4, with the nozzle is movable into a well defined end position outside the end face of the drum 14 before starting the plotting operation. In this position in which the jet does not impinge on the drum surface the carriage is held stationary. The control signal applied to the control electrode 36 through the amplifier is zero so that the drops of the jet 6 are not charged.

Now, if a low frequency sawtooth voltage generated by a sawtooth generator circuit 50 is applied to the electrode 26 in the ink conduit 4 leading to the nozzle 2, the drops will be charged according to the momentary amplitude of the ramp or sawtooth voltage. Thus, on their way through the deflection electrodes 34*a* and b the drops will be deflected depending on their charge. Since this charge varies in a sawtooth-like fashion, the direction of the jet will vary slowly in the same way. It should be observed that any other periodically varying signal can be used instead of the sawtooth signal described above. A suitable value of the peak-to-peak amplitude of such signals is about 40–100 volts. The average value of the sawtooth signal amplitude is adjustable by an adjustable DC-source 52.

A thin electrically conductive wire-shaped target 54 is fixed beyond the end of the drum 14 in the path of the jet 1 in a well defined vertical position relative to the drum 14 so that it extends roughly parallel to a diameter of the drum surface. If and when this wire is hit be the jet 6 a spray is formed which is directed towards a collector electrode 56 positioned closely behind the wire target 54. By applying a voltage of, say, 1000 to 2000 volts generated by a voltage source 58 between the wire target 54 and the collector electrode 56, the drops of the spray become strongly charged when bouncing off the wire target 54 and are therefore attracted by the collector electrode 56. This result in a current of, say, about 1 $\mu$A between the wire target 54 and the electrode 56 which current can be detected, e. g. by an amplifier 62 coupled to a current sensing resistor 60. Thus, if a voltage is generated across the resistor 60 this indicates that the jet hits the wire target 54.

This effect can be used to adjust the jet direction automatically so that it hits the wire target as shown in FIG. 4. As long as the sawtooth generator 50 is running freely the jet direction will sweep back and forth. During each sweep period, the jet will hit the wire target 54 twice, each time generating a voltage pulse across the resistor 60. After amplification in the amplifier 62 and waveform shaping by a Schmitt trigger circuit 64 this voltage pulse will be applied to a stop input of the sawtooth generator 50. As soon as this signal is sensed by the generator 50, the latter will discontinue to generate the sawtooth signal and keep its output voltage applied to the electrode 26 constant. Alternatively, momentary value of the sawtooth voltage at the time of occurrence of the voltage pulse from the resistor 60 can be detected by a sample- and hold circuit. In this way the jet direction will be fixed and directed exactly against the wire target 54. After this adjustment procedure the plotting of the image may be started, the output voltage of the sawtooth generator or the sample- and -hold circuit being held constant during at least one plotting operation.

In FIG. 4 the wire target 54 is positioned stationary relative to the drum. Alternatively the target could be positioned on the carriage. Further, the target does not need to have the shape of a wire but may have various different shapes. Thus, as an example, the extreme edge of the gutter device mounted on the carriage and used to intercept the deflected drops in the "off" position of the jet may serve as such a target. Since the gutter device normally is electrically connected or mechanically attached to one of the deflection electrodes 34*a* or 34*b* and this electrode is kept at a high voltage, e.g. 2000 volts, the separate voltage source 58 can be omitted and the collector electrode 56 is then connected to ground via the resistor 60. Even in this case the adjustment procedure has to take place when the carriage is in an end position outside the recording surface and before the actual plotting operation is started. Of course a small constant offset voltage must be included in the bias to clear the jet from the gutter during the recording operation. The sawtooth voltage has to be stopped with a slight delay so that the jet passes immediately over the upper edge of the gutter device.

Figure 5:
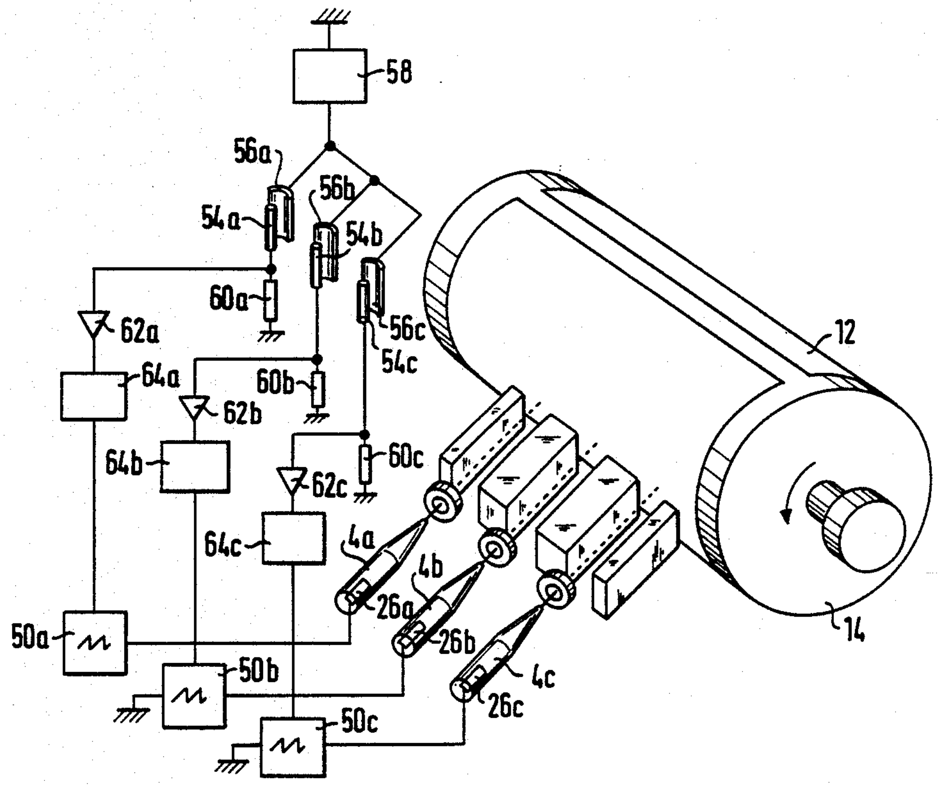
FIG. 5 is a similar view as FIG. 4 for a three ink jet plotter.

If e.g. three jets are used in a plotter as shown in FIG. 5 the above described method can be used for the automatic adjustment of the registry of the three jets relative to each other in the x direction. This is accomplished by placing three wire targets 54*a–c* in precisely defined positions relative to each other along and slightly outside one end of the surface of the drum 14. Behind each wire target 54*a–c* a collector electrode 56*a–c* respectively, is positioned. These electrodes are maintained at a voltage of about 1000–2000 volts by the voltage generator 58. Alternatively a single collector electrode may be used. As in FIG. 4, the wire targets 54*a–c* are connected to current sensing resistors 60*a–c* and amplifiers 62*a–c*, respectively. The output of the amplifiers is applied to Schmitt-triggers 64*a–c* which in turn are connected to the stop input of the three sawtooth generators 50*a–c*, respectively.

In operation, before starting a plotting opertion, the carriage 17 (FIG. 1) not shown in FIG. 5, is moved into such a position that the jets 61a–c can strike the wire target 54*a–c* while the sawtooth generators 50*a–c* are running freely. This causes the jets 61*a–c* to sweep in a sawtooth fashion in the x direction. As soon as one of these jets, e. g. jet 6*a*, hits its wire target 54*a*, a signal will be generated across the resistor 60*a*. After passing through the amplifier 62*a* and the Schmitt trigger 64*a*, this signal will stop the sawtooth generator 50*a*. Thus, a constant DC voltage is now supplied by the sawtooth generator 50*a* to the electrode 26*a*, this voltage being equal to the sawtooth signal voltage at the time of the arrival of the stop signal from the Schmitt trigger 64*a*. Thereafter, the direction of the jet 6*a* will be kept constant so that the jet continuously hits the wire target 54*a*. Since this will also be true for the other two jets 6*b* and 6*c*, after a short time all three jets 6*a–c* will hit their respective targets 54*a–c*. If the spacing between these wire targets is carefully controlled and equal to the desired spacing of the jets, the jets will be in registry with each other in the x direction. After that (save the adjustment of the jets in the y direction described below) the plotting operation can start. If necessary, this adjustment of the jet registry can be carried out after each plotting operation by moving the carriage into the adjustment position in front of the wire targets 54*a–c*.

Figure 6:
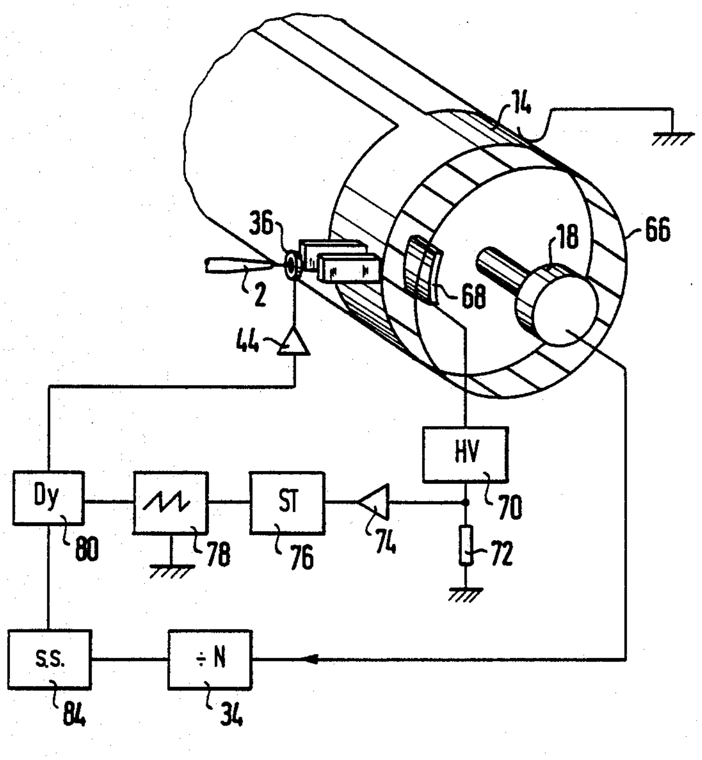
FIG. 6 is a schematic view of the parts and circuitry of an ink jet plotter usefull for automatic adjustment of an ink jet in the circumferential direction of the drum according to another aspect of the present invention.

Reference is now made to FIG. 6 for explaining the automatic adjustment of jet registry in the y direction which is effected by somewhat similar means as the adjustment in the x direction. For clarity the method is described for a single jet in FIG. 6, however, it is obvious that it can be used equally well with a plurality of jets.

As has been pointed out above, registry of the jets in the y direction can be achieved by adjustment of the delay time of the delay circuit 42 in FIG. 2. To achieve this adjustment automatically the apparatus shown in FIG. 6 can be used. A wire cage 66 made of a plurality of wires extending in parallel from one end of the drum surface is attached to the drum 14 which is at ground potential. For the proper functioning of the device it is essential that these wires are spaced equally around the circumference of the drum so that the distance between them is constant with a high degree of precision. Behind this wire cage 66 a collector electrode 68 is mounted, the potential of which is kept at, say, 1000–2000 volts by a high voltage source 70. If the jet 6 hits a wire, a current is generated through a voltage sensing resistor 72, thereby creating a signal voltage. As before, this signal voltage is amplified in an amplifier 74 and pulse-shaped in a Schmitt trigger circuit 76 before being applied to the stop input of a sawtooth generator 78, the output of which controls the delay time of a delay circuit 80.

To adjust the point of incidence of the jet in the y direction, the carriage, not shown in FIG. 6 with the nozzle 2 is moved in front of the wire cage 66, so that jet is directed through the cage 66 towards the collector electrode 68. As soon as the drum rotates with the speed required during the plotting operation, the signal from the shaft encoder 18 is divided by a constant number in a divider circuit 82 so that the number of pulses applied to a signal source 84 is equal to the number of horizontal wires of the wire cage 66. In the signal source 84 an on-off control signal for the jet is generated which most of the time deflects the jet into the gutter (not shown in FIG. 6) except for a short moment when a pulse is received from the divider circuit 82. This output signal from the signal source 84 is then delayed in the delay circuit 80 and applied to the control electrode 36 after passing the control amplifier 44. In this way most of the time the jet will be in the "off" mode and not reach the collector electrode 68. However, during one revolution of the drum the jet will be switched into the "on" mode by short pulses applied to the control electrode 36 as many times as there are horizontal wires in the wire cage 66, which each time causes a drop train of a few drops to travel towards the collector electrode 68.

Since the drops of the jet are practically uncharged during the "on"-mode, these drop trains will produce no current in the resistor 72 when arriving at the collector electrode 68. Hence normally no voltage signal is generated across this resistor 72. However, if the drop train hits a wire of the wire cage 66, the resulting spray of charged drops collected by the electrode 68 will cause a voltage pulse to be generated across the resistor 22. When this will happen depends on the phase between the control signal applied to the control electrode 36 and the position of the wires in the wire cage 66.

At the start of the adjustment the sawtooth generator runs freely at a frequency much lower than the frequency of the pulses generated by the shaft encoder 18. Since the output of the sawtooth generator 78 controls the delay time of the delay circuit 80, the position where the drop trains generated by the control signal from the signal source 84 transverse the wire cage 66 will vary with the output voltage of the generator 78. As long as the drop trains pass between the wires of the wire cage 66, the sawtooth generator will continue to change the signal delay caused by the delay circuit 80. However, as soon as this signal delay has reached a value so that the drop train hits the wires of the wire cage 66, pulses will be generated across the resistor 72, which stop the sawtooth generator 78. This in turn causes the signal delay time to be held constant, so that the drop trains always hit the equally spaced wires of the wire cage 66. Thereby the point of incidence of the jet on the drum is adjusted in the y direction relative to the pulses generated by the shaft encoder 18. Thereafter the plotting operation can proceed.

Obviously the signal triggering the signal source 84 can be derived in alternative ways, e. g. by a photoelectric device detecting the wires of the wire cage 66. Further, this method can be applied to a plurality of jets mounted on a carriage 10 as shown in FIG. 1, thereby ensuring the registration of the points of incidence of these jets on the drum 14 relative to each other.

Finally, it is obvious to anyone skilled in the art that the same methods for the manual or automatic adjustment can be used to ensure the registry of a plurality of jets also for other geometries of the record receiving surface than the drum geometry described above. A typical example of this would be a slowly advancing continuous web which is printed on by a plurality of ink jets mounted on a carriage transversing the web at right angles to the direction of web movement. In that case it is obvious that the direction of the deflection field between the deflection electrode 34*a* and 34*b* has to be approximately normal to the direction of the relative movement between the carriage carrying the ink jet nozzles and the record receiving surface. This is true also for any other geometry of the record receiving surface or other types of relative movement between the jet and the record receiving surface.

I claim:

1. In an improved ink jet recording method producing at least one ink jet which disintegrates into a series of minute drops, selectively charging the drops to determine whether an individual drop, in a recording mode, is intended to travel along a recording path to impinge onto a predetermined location on an ink receiving surface or is prevented to produce a record on said surface, deflecting each charged drop by an electric deflecting field by an amount depending on the charge of the drop, and effecting relative transverse motion between the path of the record producing drops and the record surface, the improvement comprising in combination determining any deviation between said predetermined location and an actual location of impingement of the jet, and applying an adjustable bias charge to each drop at least during the recording mode, said bias charge being chosen so that the deflection of the drop caused by the action of said electric deflecting field on said bias charge carried by said drop minimizes said deviation.

2. The method as claimed in claim 1, wherein said deviation is determined by effecting relative movement between said jet and a sensor element extending normal to the direction of the adjustment.

3. The method as claimed in claim 1 wherein the directions of a plurality of ink jets are adjusted independently of each other by an equal number of independently adjustable bias voltages.

4. The method as claimed in claim 1, wherein a control signal which controls said selectively charging is delayed by an adjustable period of time relative to a signal indicative of said relative motion.

5. A method claimed in claim 4 wherein the control signal is delayed while being transmitted from a control signal source to a control electrode controlling the charging of the drops.

6. A method as claimed in claim 4, wherein read-outs of digital data signals from a signal source are delayed before being converted into a control signal pulse controlling the charging of the drops.

7. A method as claimed in claim 1 where the bias charge is produced by a DC bias voltage is responsive to an error signal derived from a sensor that senses the direction of the jet in the x direction.

8. A method as claimed in claim 4 wherein the delay is adjusted by an error signal derived from a sensor that senses the direction of the jet in the y direction.

9. A method as claimed in claim 7 wherein the sensor is a photoelectric detector which measures the position of a trace laid down by the jet on a record surface.

10. A method as claimed in claim 7 wherein the jet direction is detected by a current produced when the jet hits a target which is biased by a high voltage source with respect to an electrode positioned in the path of the jet behind said target.

11. Apparatus for adjusting the direction of a jet in an ink jet printing device using at least one electrically controllable continuous ink jet, said apparatus comprising:

a. nozzle means (2) to generate a liquid jet (6) which disintegrates into a train of drops at a point of drop formation and propagates along an ink jet path;

b. control electrode means (36) to charge the drops of the jet in response to an electrical control signal;

c. means (34*a*, 34*b*) to generate an electric deflection field essentially perpendicular to the jet direction;

d. means (38) to select the drops on the basis of their charge to determine, whether a specific drop proceeds to and impinges on a predetermined location on a record receiving surface or is intercepted and prevented to proceed to said surface, characterized by e. means (46) to apply an adjustable DC bias voltage between the jet liquid and the control electrode means (36) to adjust the jet direction in a plane parallel to the electric deflection field, said bias voltage being appreciably lower than the control signal voltage, which effects said selection.

12. The apparatus claimed in claim 11 characterized by means to introduce an adjustable delay between the control signals applied to the control electrode and a signal responsive to said relative motion.

13. The apparatus as claimed in claim 12, characterized by an adjustable delay unit (42) coupled in series with a control signal path.

14. The apparatus as claimed in claim 12, characterized by means for delaying data read-outs of digital data signals from a signal source before converting said data signals into the control signal.

15. The apparatus as claimed in claim 11, characterized by means for deriving an error signal from a sensor (54, 56; 66, 68) which senses the position of the jet in a predetermined of two mutually crossing directions (x, y).

16. The apparatus as claimed in claim 15, wherein said sensor is a photoelectric detector which senses the position of a trace laid down by the jet on a record surface.

17. The apparatus as claimed in claim 15 wherein said sensor comprises means (50) for applying a variable bias charge on the drops of the jet to cause a variable deflection of the path of the drops of the ink jet; target means positioned to be hit by said drops at a predetermined deflection;

electrode means (56) positioned in the direction of propagation of said ink jet behind said target means; a high voltage source (58) having terminals coupled to said target and electrode means, respectively, to produce a current between said target and electrode means when said target is hit by said ink jet; and means (60) for sensing said current.

* * * * *